USO11300358B2

(12) United States Patent
Pal et al.

(10) Patent No.: US 11,300,358 B2
(45) Date of Patent: Apr. 12, 2022

(54) GRANULAR MATERIAL DRYER FOR PROCESS OF RESIN MATERIAL PRIOR TO MOLDING OR EXTRUSION

(71) Applicant: MachineSense, LLC, Baltimore, MD (US)

(72) Inventors: Biplab Pal, Ellicott City, MD (US); Steve Gillmeister, Baltimore, MD (US)

(73) Assignee: Prophecy Sensorlytics, LLC, Baltimore, MD (US)

(*) Notice: Subject to any disclaimer, the term of this patent is extended or adjusted under 35 U.S.C. 154(b) by 472 days.

(21) Appl. No.: 16/229,713

(22) Filed: Dec. 21, 2018

(65) Prior Publication Data
US 2019/0113281 A1 Apr. 18, 2019

Related U.S. Application Data

(62) Division of application No. 14/833,111, filed on Aug. 23, 2015.

(51) Int. Cl.
*F26B 25/00* (2006.01)
*G06N 20/00* (2019.01)
*G05B 23/02* (2006.01)

(52) U.S. Cl.
CPC ........ *F26B 25/009* (2013.01); *G05B 23/0272* (2013.01); *G06N 20/00* (2019.01)

(58) Field of Classification Search
CPC .... F26B 25/009; G05B 23/0272; G06N 20/00
See application file for complete search history.

(56) References Cited

U.S. PATENT DOCUMENTS

| 4,023,940 A | 5/1977 | Shultz |
| 4,131,011 A | 12/1978 | Ling |
| 5,150,289 A | 9/1992 | Badavas |
| 5,474,594 A * | 12/1995 | Khelifa ............... B01D 53/261 95/14 |
| 5,487,225 A | 1/1996 | Downie |

(Continued)

FOREIGN PATENT DOCUMENTS

| CN | 201672991 | 12/2010 |
| CN | 102539911 A | 7/2012 |

(Continued)

OTHER PUBLICATIONS

Plastic Technology, https://www.ptonline.com/knowledgecenter/Plastics-Drying/Dryer-Types/Desiccant-Wheel-Rotor-Dryers, Jan. 15, 2014.*

(Continued)

*Primary Examiner* — Alexander Satanovsky
(74) *Attorney, Agent, or Firm* — Fox Rothschild LLP

(57) ABSTRACT

A machine learning method and system for predictive maintenance of a dryer. The method includes obtaining over a communication network, an information associated with the dryer and receiving measurements of a vibration level of one of a process blower, a cassette motor and a regeneration blower associated with the dryer. Further, an anomaly is determined based on at least one of a back pressure and a fault and balance of at least one of the process blower and the regeneration blower is tracked. An alarm for maintenance is raised when one of an anomaly and an off-balance is detected.

1 Claim, 10 Drawing Sheets

(56) References Cited

U.S. PATENT DOCUMENTS

| | | |
|---|---|---|
| 5,610,339 A | 3/1997 | Haseley et al. |
| 5,825,338 A | 10/1998 | Salmon et al. |
| 5,995,561 A | 11/1999 | Yamasaki et al. |
| 6,104,987 A | 8/2000 | Farnsworth |
| 6,289,606 B2 | 9/2001 | Gillette et al. |
| 6,330,525 B1 | 12/2001 | Hays |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 9,781,243 B1 | 10/2017 | Huang |
| 10,041,844 B1 | 8/2018 | Brady |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 | 9/2004 | Edie |
| 2004/0199573 A1 | 10/2004 | Schwarz et al. |
| 2005/0049834 A1 | 3/2005 | Bottomfield |
| 2005/0222794 A1 | 10/2005 | Baird et al. |
| 2006/0137105 A1 | 6/2006 | Hong et al. |
| 2006/0168195 A1* | 7/2006 | Maturana ............ G06F 11/0709 709/224 |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis |
| 2008/0109185 A1 | 5/2008 | Cheung et al. |
| 2008/0289045 A1 | 11/2008 | Fryer |
| 2008/0294382 A1 | 11/2008 | Lim |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0010961 A1* | 1/2011 | Wehrheim ............ D06F 58/04 34/549 |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2011/0307220 A1 | 12/2011 | Lacaille |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 | 5/2014 | Lill |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0193697 A1* | 7/2015 | Vasseur ............ H04L 43/0876 706/12 |
| 2015/0233792 A1 | 8/2015 | Gao |
| 2015/0233856 A1 | 8/2015 | Samuilov et al. |
| 2015/0247670 A1 | 9/2015 | Robertson et al. |
| 2015/0261215 A1* | 9/2015 | Blevins ............ G05B 19/4184 700/17 |
| 2016/0086285 A1 | 3/2016 | Jordan Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0006135 A1 | 1/2017 | Siebel |
| 2017/0032281 A1 | 2/2017 | Hsu |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | |
|---|---|---|
| CN | 103399486 A | 11/2013 |
| CN | 203362223 U | 12/2013 |
| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013-041440 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |
| WO | WO 2017-1234525 A1 | 7/2017 |

OTHER PUBLICATIONS

International Search Report and Written Opinion for PCT Application No. PCT/US16/18820; dated Aug. 4, 2016.
International Search Report and Written Opinion for PCT Application No. PCT/US15/066547; dated Mar. 17, 2016.

(56) References Cited

OTHER PUBLICATIONS

Sensors Drive Mobile IoT; Wong, William; Jan. 26, 2015; Electronic Design.
International Search Report and Written Opinion for PCT Application No. PCT/US16/028724; dated Aug. 22, 2016.
International Search Report and Written Opinion for PCT Application No. PCT/US16/18831; dated Aug. 12, 2016.
Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Diagnosis Method Study in Roller Bearing Based on Wavelet Transform and Stacked Auto-encoder, by Junbo Tan, et al., dated Feb. 2015, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Detection of Precursor Wear Debris in Lubrication Systems by Jack Edmonds, et al., dated May 2000, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and SOM by Shuai Shi, et al., dated Aug. 2012, published by IEEE.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).
Holler, J. et al. (2014). "From Machine-to-machine to the Internet of Things: Introduction to a New Age of Intelligence." Chapters 2, 4, 5, 7, 10, 12. Academic Press. DOI:10.1016/B978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.IEEE.org/document/8089336/ Future Edge Cloud and Edge. Computing for Internet of Things Applications—Janali Pan et al.
Challenges and Solutions of Protecting Variable Speed Drive Motors; Aversa, et al.; Feb. 11, 2013; Presented at the 2013 Texas A&M Conference for Protective Relay Engineers.
Vasudevan, Shobha, "Still a Fight to Get It Right: Verification In The Era of Machine Learning", 2017 IEEE International Conference on Rebooting Computing (ICRC), Washington, DC, 2017, pp. 1-8. (Year: 2017).

\* cited by examiner

# GRANULAR MATERIAL DRYER FOR PROCESS OF RESIN MATERIAL PRIOR TO MOLDING OR EXTRUSION

CROSS REFERENCE TO RELATED PATENTS AND PATENT APPLICATIONS

This patent application is a 35 USC 120 division of U.S. patent application Ser. No. 14/833,111 filed 23 Aug. 2015 in the names of Biplap Pal and Steve Gilmeister and assigned to ProphecySensors, LLC of Baltimore, Md.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

INCORPORATION BY REFERENCE

Applicant incorporates by reference the disclosures of the following United States patent Publications: US 2018/0077522 A1, published 15 Mar. 2018, entitled "Predicting Dryer Maintenance Using Machine Wearables"; US 2017/0178030 A1, published 22 Jun. 2017, entitled "Method, System And Apparatus Using Field Learning To Upgrade Trending Sensor Curves Into Fuel Gauge Based Visualization Of Predictive Maintenance By User Driven Feedback Mechanism;" US 2016/0245765 A1, published 21 Feb. 2016, entitled "Method For Accurately Measuring Real-Time Dew-Point Value And Total Moisture Content Of A Material"; US 2016/0245279 A1, published 23 Feb. 2015, entitled "Real Time Machine Learning Based Predictive and Preventive Maintenance of a Vacuum Pump"; US 2017/0011298 A1, published 2 Jul. 2015, entitled "Internet of Things Based Determination of Machine Reliability and Automated Maintenance, Repair, and Operation (MRO) Logs"; US 2016/0313216 A1, published 6 Nov. 2015, entitled "Fuel Gauge Visualization of IOT Based Predictive Maintenance System Using Multi-Classification Based Machine Learning"; US 2016/0291552 A1, published 2 Dec. 2015, entitled "System For Rule Management, Predictive Maintenance And Quality Assurance Of A Process And Machine Using Reconfigurable Sensor Networks And Big Data Machine Learning"; US 2017/0160328 A1, published 2 Dec. 2015, entitled "Distributed IOT Based Sensor Analytics for Power Line Diagnosis"; US 2016/0245686 A1, published 22 Dec. 2015, entitled "Fault Detection In Rotor Driven Equipment Using Rotational Invariant Transform Of Sub-Sampled 3-Axis Vibrational Data"; US 2017/0201585 A1, published 13 Jul. 2017, entitled "Distributed Edge Processing of Internet of Things Device Data in Co-Location Facilities"; US 2017/0060574, published 2 Mar. 2017, entitled "Edge Intelligence Platform and Internet of Things Censor Stream System"; US 2017/0163444, published 8 Jun. 2017, entitled "Apparatus and Method for Using and Internet of Things Edge Secure Gateway"; and WO 2017/123425, published 20 Jul. 2017, entitled "Distributed Edge Processing of Internet of Things Device Data in Co-Location Facilities".

FIELD OF TECHNOLOGY

The present invention relates to Internet of Things (IoT), more particularly to an IoT-based predictive maintenance of an industrial dryer through machine learning of heater currents, process blowers and regenerative blowers.

BACKGROUND OF THE INVENTION

Internet of Things (IoT) is a network of uniquely-identifiable, purposed "things" that are enabled to communicate data pertaining thereto, there between over a communications network whereby, the communicated data form a basis for manipulating the operation of the "things". The "thing" in the "Internet of Things" could virtually be anything that fits into a common purpose thereof. For example, the "thing" could be a person with a heart rate monitor implant, a farm animal with a biochip transponder, an automobile that has built-in sensors to alert its driver when tire pressure is low and the like. The "thing" can be any other natural or man-made entity that can be assigned with a unique IP address and provided with an ability to transfer data over a network. Notably, if all the entities in an IoT are machines, then the IoT is referred to as "a Machine to Machine" (M2M) IoT or simply, as M2M IoT.

It is apparent from the aforementioned examples that an entity becomes the "thing" of a M2M IoT especially, when the entity is attached with one or more sensors capable of: capturing one or more types of data pertaining thereto: segregating the data (if applicable); selectively communicating each segregation of data to one or more fellow "things"; receiving one or more control commands (or instructions) from one or more fellow "things" wherein, the control commands are based on the data received by the fellow "things"; and executing one or more commands resulting in the manipulation or "management" of an operation of the corresponding entity. Therefore, in an IoT-enabled system, the "things" basically manage themselves without any human intervention, thus drastically improving the efficiency thereof.

US Patent application 20120330614 A1 discusses a method for obtaining information associated with a machine having one or more components, wherein the information includes multiple rules associated with the components. The method also includes receiving measurements of a vibration level of the machine and generating, based on the measurements, one or more feature values for one or more features associated with the one or more components. The method further includes determining a component-related condition for the one or more components based on the one or more feature values and rules. In addition, the method includes providing an indicator identifying the component-related condition. The application discusses a rule based system and mechanism. Further, the application fails to disclose an ability to adapt and learn.

U.S. Pat. No. 8,868,242 B2 discusses a system for monitoring a plant equipment. Another aspect provides an automated analysis system wherein software instructions operably compare sensor data to predefined valves and determine mechanical problems in multiple machines. In another aspect, a cement manufacturing system includes sensors for sensing movement conditions of cement making machines. A further aspect provides a central computer connected to vibration sensors associated with cement making machines where software instructions perform real-time comparisons and machine performance determinations based at least in part on sensed signals. The patent discusses manufacturing equipment and more particularly an automated analysis system for monitoring manufacturing plant machinery.

U.S. Pat. No. 8,920,078 B2 discusses a pneumatic conveyance of grain or other dry and loose commodities. The system conveys the commodity from a first piece of equipment to a second piece of equipment. Parameters used in determining blower motor speed may include the gauge pressure measured in a transport pipe, the rate of discharge of commodity into the transport pipe and the blower motor current or power. The patent fails to show or suggest a means of predictive maintenance. Further, it does not involve machine learning mechanisms.

US patent application 2014/0223767 A1 discusses a system for effectively purging heat regenerating desiccant compressed air dryers from a moisture load by a 'tuned' regenerating means with the use of a variable restriction on the blower purge air flow, a blower back-pressure set point, a heater discharge temperature set point and a bottom area bed temperature of a vessel containing desiccant, a means to balance purge temperature to a stable, non-cycling state preventing an under and overheating heating of desiccant, vessel and associated piping. A valve control means to terminate heating, cooling and dry purge operations selectively operated to allow purge flows to quickly cause water vapor captivated by the desiccant (in a drying cycle) to be released and purged out of the vessel (in a regeneration cycle) resulting in a regenerated tower vessel prepared for a compressed air drying cycle. However, the patent application fails to show any means of adapting and learning.

U.S. Pat. No. 5,610,339A discusses a method for determining and predicting a present and a future condition of a machine having at least one rotative element. The method includes an initial step of storing in a memory, a predetermined logic routine and at least one predetermined key frequency of the rotative element of the machine. The machine is operated in a predetermined operational state and during operation the mechanical motion of the rotative element is sensed by at least one sensor. The sensed mechanical motion of the rotative element is converted into a corresponding electrical signal and the predetermined operational state of the machine is correlated with the corresponding electrical signal. The corresponding electrical signal is inputted into corresponding vibration data by utilizing the predetermined logic routine. Then, the corresponding vibration data is compared with at least one predetermined key frequency to predict the present and future condition of the machine. A control signal is transmitted to the machine in order to control. This patent amongst others fails to show any means of collecting real time data from across location and also fails to adapt or learn. It is evident from the discussion of the aforementioned prior arts that none of them pave way for the predictive and preventive maintenance of dryers through machine learning. The prior art inventions also fail to disclose the use of IoT. There is a need in the art for a solution to the aforementioned problem.

SUMMARY OF THE INVENTION

Disclosed are a method, an apparatus and/or a system of IoT-based predictive maintenance of an industrial dryer though machine learning.

In one aspect, a machine learning method for predictive maintenance of a dryer includes various steps. Information associated with the dryer is obtained over a communication network. The information includes measurements of a current associated with one or more heaters in a heater bank and the heater bank is associated with the dryer. Further, measurements of a vibration level of one of a process blower, a cassette motor and a regeneration blower associated with the dryer is received. An anomaly based on one of a back pressure and a fault is determined. The anomaly is determined through an IoT based method. Still further, a balance of one of the process blower and the regeneration blower is tracked. Also, an alarm for maintenance is raised when an anomaly or a misalignment is detected in real time or predicted for a future time. The prediction is based on a machine learning algorithm.

In another aspect, a machine learning architecture associated with a dryer includes one or more heaters, one or more machine wearable sensors, a process blower, a cassette motor and a regeneration blower associated with the one or more machine wearable sensors. A sensor data is received over a communication network. The sensor data comprises vibration and current measurement. An anomaly based on a back pressure or a fault is determined and a balance between the process blower and the regeneration blower is tracked. An alarm for maintenance is raised when an anomaly or a misaligned balance is detected. Further, the anomaly and the off-balance condition is detected in real time or predicted for a future time and the prediction is based on a machine learning algorithm.

The method and system disclosed herein may be implemented in any means for achieving various aspects, and may be executed in a form of a machine-readable medium embodying a set of instructions that when executed by a machine causes the machine to perform any of the operations disclosed herein. Other features will be apparent from the accompanying drawings and from the detailed description that follows.

The following detailed description is merely exemplary in nature and is not intended to limit the described embodiments of the invention or uses of the described embodiments. As used herein, the words "exemplary" and "illustrative" mean "serving as an example, instance, or for illustration." Any implementation or embodiment or abstract disclosed herein as being "exemplary" or "illustrative" is not necessarily to be construed as preferred or advantageous over other implementations, aspects, or embodiments. All of the implementations or embodiments described in the detailed description are exemplary implementations and embodiments provided to enable persons of skill in the art to make and to use the implementations and embodiments as disclosed below, to otherwise practice the invention, and are not intended to limit the scope of the invention, which is defined by the claims.

Furthermore, by this disclosure, there is no intention on the part of the Applicant to be bound by any express or implied theory presented in the preceding materials, including but not limited to the summary of the invention or the description of the prior art, or in the following detailed description of the invention. It is to be understood that the specific implementations, devices, processes, aspects, and the like illustrated in the attached drawings and described in the following portion of the application, usually referred to as the "specification," are simply exemplary embodiments of the inventive concepts defined in the claims. Accordingly, specific dimensions and other physical characteristics relating to the embodiments disclosed herein are not to be considered as limiting as respecting the invention unless the claims or the specification expressly state otherwise.

BRIEF DESCRIPTION OF THE DRAWINGS

The embodiments of the present invention are illustrated by way of example and not as limitation in the accompanying drawings in which like references indicate similar elements and in which.

Figure 1:
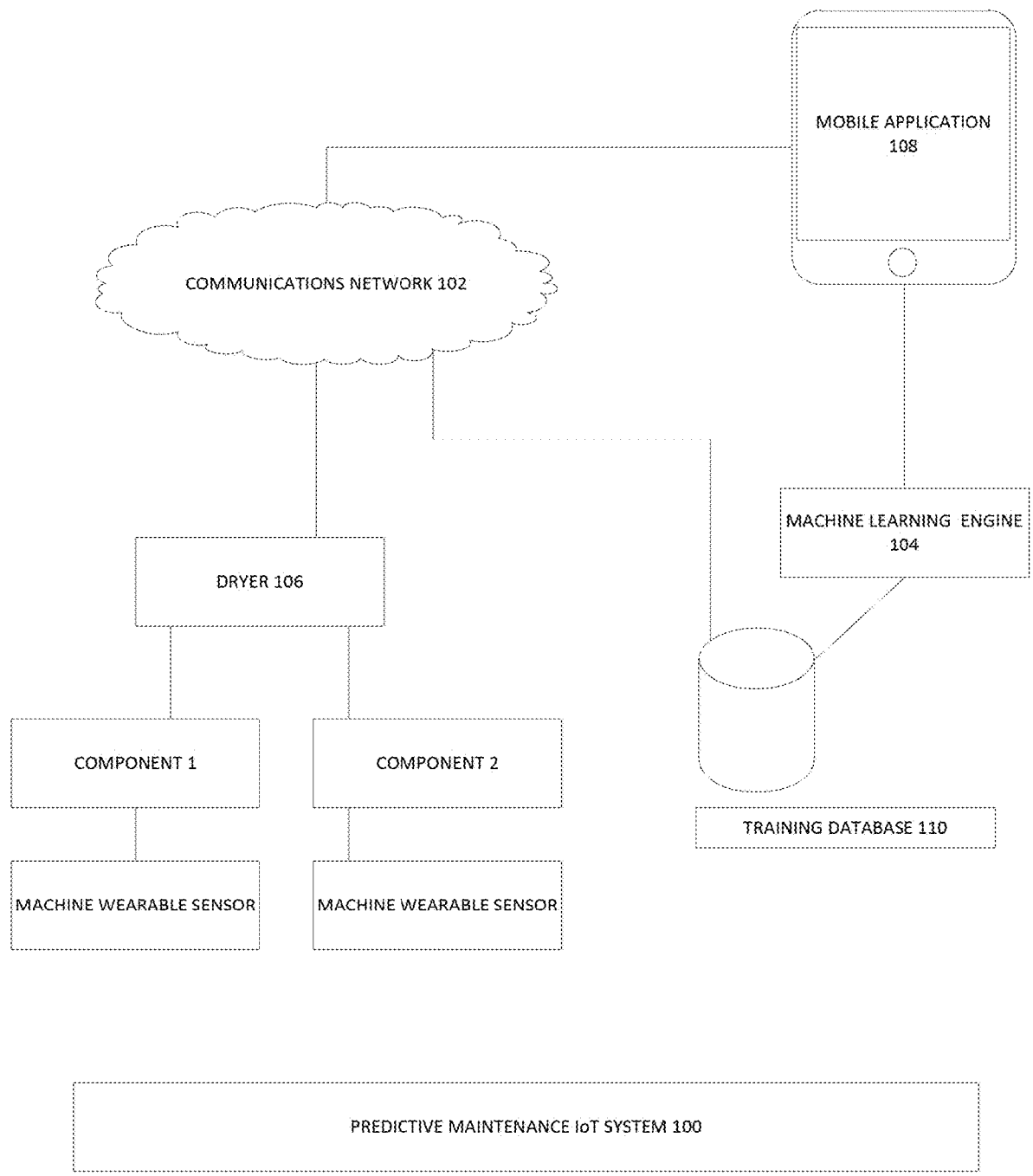
FIG. 1 is a diagrammatic representation of a predictive maintenance IOT system associated with a dryer, according to one or more embodiments.

Other features of the present embodiments will be apparent from the accompanying drawings and from the detailed description that follows.

DETAILED DESCRIPTION OF THE INVENTION

Example embodiments as described below may be used to provide a method, an apparatus and/or a system of machine learning for predictive maintenance of a dryer. Although the present embodiments have been described with reference to specific example embodiments, it will be evident that various modifications and changes may be made to these embodiments without departing from the broader spirit and scope of various embodiments.

In one or more embodiments, a machine learning method for predictive maintenance of a dryer may include obtaining an information associated with the dryer over a communication network. The information may include measurements of a current associated with one or more heaters. The heater may be associated with the dryer.

Further, the method may include receiving measurements of a vibration levels of one or more of a process blower, a cassette motor and a regeneration blower associated with the dryer. An anomaly may be determined based on one or more of a back pressure and a fault. The anomaly may be determined through an IoT (Internet of Things) based method. Still further, the method may include tracking a balance of the process blower or the regeneration blower and raising an alarm for maintenance when an anomaly or an off-balance is detected. An alarm for maintenance may be raised when an anomaly and/or off-balance is predicted by a machine learning engine associated with a machine learning algorithm.

Further, the method may include receiving sensor data from one or more machine wearable sensors placed on one of the heater, the process blower, the cassette motor and a regeneration blower associated with the dryer. The measurements and the information may be received at a data collection unit.

In one or more embodiments, a dryer system may be considered to be well balanced when a vibration associated with the dryer system is within an acceptable level. The acceptable level may be defined by a user of the dryer system.

In one or more embodiments, the heater, the process blower, the cassette motor and the regeneration blower associated with the dryer may be in an off-balance state when an associated value such as vibration is beyond a user defined and/or pre-defined level.

In one or more embodiments, the data collection unit may be one of a mobile device and a wireless enabled device.

In one or more embodiments, the machine wearable sensor on a heater may be a power factor and/or a current sensor. The machine wearable sensor may be attached through a three (3) phase and/or two (2) phase line associated with the heater.

In one or more embodiments, a sensor may be mounted onto the heater. The sensor may be a current and/or power factor sensor. The heater may be associated with the dryer system. The dryer may be associated with one or more machine wearable sensors. The machine wearable sensors may be associated externally with the dryer at various components of the dryer system. The machine wearable sensors may be associated with the dryer magnetically. Functions of the machine wearable sensors may include tracking vibration and/or magnetic fields.

In one or more embodiments, the dryer may also be referred to as a dryer system. The dryer system may include one or more components such as blower and a heater.

In one or more embodiments, a machine learning architecture may be associated with the machine learning algorithm. The normal state of the dryer may be learned as a baseline reading. The baseline readings and anomalous readings from the back pressure and the off-balance may be tracked to raise an alarm. The baseline reading and the anomalous readings may be used as a training database.

In one or more embodiments, any state other than an ideal state may be referred to as an off-balance.

In one or more embodiments, data may be acquired from multiple dryers associated with machine wearable sensors. Further, one or more of a mobile, a web and a desktop application may act as a mobile middleware to scale the machine learning architecture to a single data collection unit. The single data collection unit may be one of a mobile device and a wireless device.

In one or more embodiments, an alarm may be raised over a communication network through one of a notification on the mobile application, short message service (SMS), email or a combination thereof.

In one or more embodiments, a failure data associated with the one or more heaters may be determined. The failure data may indicate a time of heater failure through a calculation based on a reading of current at a machine wearable sensor associated with the one or more heaters.

In one or more embodiments, a machine learning architecture associated with the dryer may include one or more heaters, one or more machine wearable sensors, a process blower, a cassette motor and a regeneration blower associated with the one or more machine wearable sensors. A sensor data may be received over a communication network. The sensor data may be one of a vibrational sensor, a magnetic sensor and a current sensor relates data. An anomaly based one of a back pressure and a fault may be determined. A balance of one of the process blower and the regeneration blower may be tracked. An alarm for maintenance may be raised when one of an anomaly and an off-balance is detected. The detection may be for a real-time scenario and/or for a future time. The anomaly and the off-balance may be one of detected in real time and predicted for a future time. Further, the prediction may be based on a machine learning algorithm.

In one or more embodiments, a machine learning architecture for predictive maintenance of a dryer may include a learning outcome that may be dependent on recognition of at least one of a pattern and deviation by the machine learning module.

In one or more embodiments, the motor sensor data may be determined from a machine wearable sensor placed on the motor. The blower sensor data may be determined from a machine wearable sensor placed on the blower. The communications network may be one of a Wi-Fi, 2G, 3G, 4G, GPRS, EDGE, Bluetooth, ZigBee, Piconet of BLE, Zwave and a combination thereof.

In one or more embodiments, the machine learning architecture may be associated with a machine learning algorithm. The motor sensor data and blower sensor data may be received over a communications network onto a mobile application coupled to a mobile device. The alarm may be raised over the communications network through one of a notification on the mobile application, short message service (SMS), email, or a combination thereof.

In one or more embodiments, a dryer system may include two or more loops. One of the loops of the dryer system may be a regeneration loop. The regeneration loop may pull in ambient air, heat the ambient air and blow the ambient air into a cassette to drive off moisture that the cassette may have absorbed from a process loop.

Another loop of the dryer system may be a process loop. The process loop may be a closed loop with a hopper. The process loop may take air from a hopper return with inlet (suction) from process blower and put the air through a filter to remove dust and other contaminants. Then blows the air (from exhaust of process blower) into the cassette. The cassette absorbs water from the air. From the cassette the air is put into a heater and put back into the hopper.

In one or more embodiments, the cassette may have two loops. The cassette may not mix ambient and dried air.

In one or more embodiments, heaters may be linked in a three phase power supply. In each phase there may be one or more heaters (1-n). A current of each phase may be measured. A ratio may be calculated such as I1/I2, I2/I3, I1/I3 for finding the phase with a faulty heater using a machine wearable sensor. The machine wearable sensor may be a power factor sensor.

The vibration of process blower, cassette motor and regeneration blower may be measured. An anomaly may be detected that may be a result of a back pressure and/or fault in a system, using an IoT based method for predictive maintenance of a dryer. Further, the balance of the blower which is essential for efficient air flow may also be tracked.

In one or more embodiments, a dryer system may encounter a back pressure anomaly and an off-balance.

In an example embodiment, streaming vibration data may be compared with the data of anomaly back pressure data. For example, back pressure greater than 18 inches water column and back pressure lesser than 6 inches water column. Statistically calculated thresholds may correctly detect normal and/or abnormal operation for the streaming input data.

In another example embodiment, RMS (Root Mean Square) of X axis vibration (In practice it can be any of the X, Y and Z axis or their spherical transformation of radial, azimuthal and polar angle) may be proportional to the back pressure level. In a normal operation, RMS of X axis vibration may be less than the RMS of X axis vibration for back pressure E.g., 20 and greater than the RMS of X axis vibration for back pressure E.g., 6. In an abnormal operation, RMS of X axis vibration should be greater than the RMS of X axis vibration for back pressure that is equal to 20 and/or less than the RMS of X axis vibration for back pressure that is equal to 6.

In an example embodiment, for a fault detection approach a shape factor of Y axis vibration data may provide separation between a balance and an off-balance operation. The shape factor of Y axis vibration may be proportional to the degree of off-balance. Off-balance may be detected when an upper limit is violated.

FIG. 1 is a system diagram of a predictive maintenance IoT system associated with a dryer, according to one or more embodiments. The predictive maintenance IoT system 100 includes a dryer 106, a machine learning engine 104, a computer database 110, a communications network 102 and a mobile application 108.

In one or more embodiments, the predictive maintenance IoT system 100 may comprise a mobile middleware 108 to receive a plurality of sensor data from one or more machines such as dryer 106 over a communications network 102. Each machine 106 may be associated with a component and each component may be associated with a machine wearable sensor. A clustering module may determine one or more clusters from the sensor data based on a pre-determined rule set stored in a training database 110. A machine learning engine 104 may classify the sensor data. Further, a base-lining architecture may base-line the classified sensor data. The base-lining architecture may be a combination of database architecture, a data training architecture and a base-lining algorithm. Further, the system may also include a regression module associated with a computer processor to predict a predictive maintenance state. The predictive maintenance state is mapped onto a depiction on a user interface.

In an example embodiment, the predictive maintenance state mapped onto a depiction on a user interface may be associated with a mobile device running a mobile application 108.

In an example embodiment, the sensor data may be determined from the machine wearable sensor placed on the motor, the machine wearable sensor placed on the blower and so on.

In one or more embodiments, the communications network 102 may be one of a Wi-Fi, 2G, 3G, 4G, GPRS, EDGE, Bluetooth, ZigBee, Piconet of BLE, Zwave, or a combination thereof.

In one or more embodiments, the machine learning engine 104 may be associated with a machine learning algorithm. The machine learning engine may be associated with one or more models selected from a group consisting a physics based model, a rule based model and a vector classifier model.

In one or more embodiments, the physics based model may include extracting physical parameters from sensor data such as total energy of vibration, multiple axes (X, Y, Z axis) of vibration, Azimuthal and polar angle of vibration rotation, RMS (Root Mean Square) value of vibration, shape factor of vibration and so on.

In one or more embodiments, a data training architecture receives an input comprising one or more of, a baseline reading and an anomalous reading from a component associated with a sensor.

In one or more embodiments, a mobile middleware is one of a mobile application, a web application and a desktop application. The mobile middleware may calibrate and baseline the sensor data.

In one or more embodiments, base-lining may include adding a data set automatically by running a good machine. Further, the good machine may be a machine in an ideal state. The ideal state may be a perception of a user of the machine. In predictive maintenance, the basic objective is to find a difference between the good machine and a bad machine. In older machines, the good machine may be a machine that the user perceives as good. The good machine may not have a new machine condition. Hence base-lining allows to take data from machines in a learning mode to archive it as "data set" which is referenced as "good machine condition" which is further used to study deviation for bad machines.

In one or more embodiments, base-lining may be of different types including manual and automatic. In manual base-lining, a user may select any machine state and attribute the selected machine state as a good baseline. In automatic base-lining, a factory default machine data may be used as a reference and once the user runs auto-baseline, a machine learning engine may adjust the factory base-line level automatically.

In an example embodiment, multiple sensor data from multiple locations may be received over a communications network 102 onto a mobile application 108 coupled to a mobile device. The alarm may be raised over the communications network 102 through one of a notification on the mobile application, short message service (SMS), email, or a combination thereof.

Figure 2:
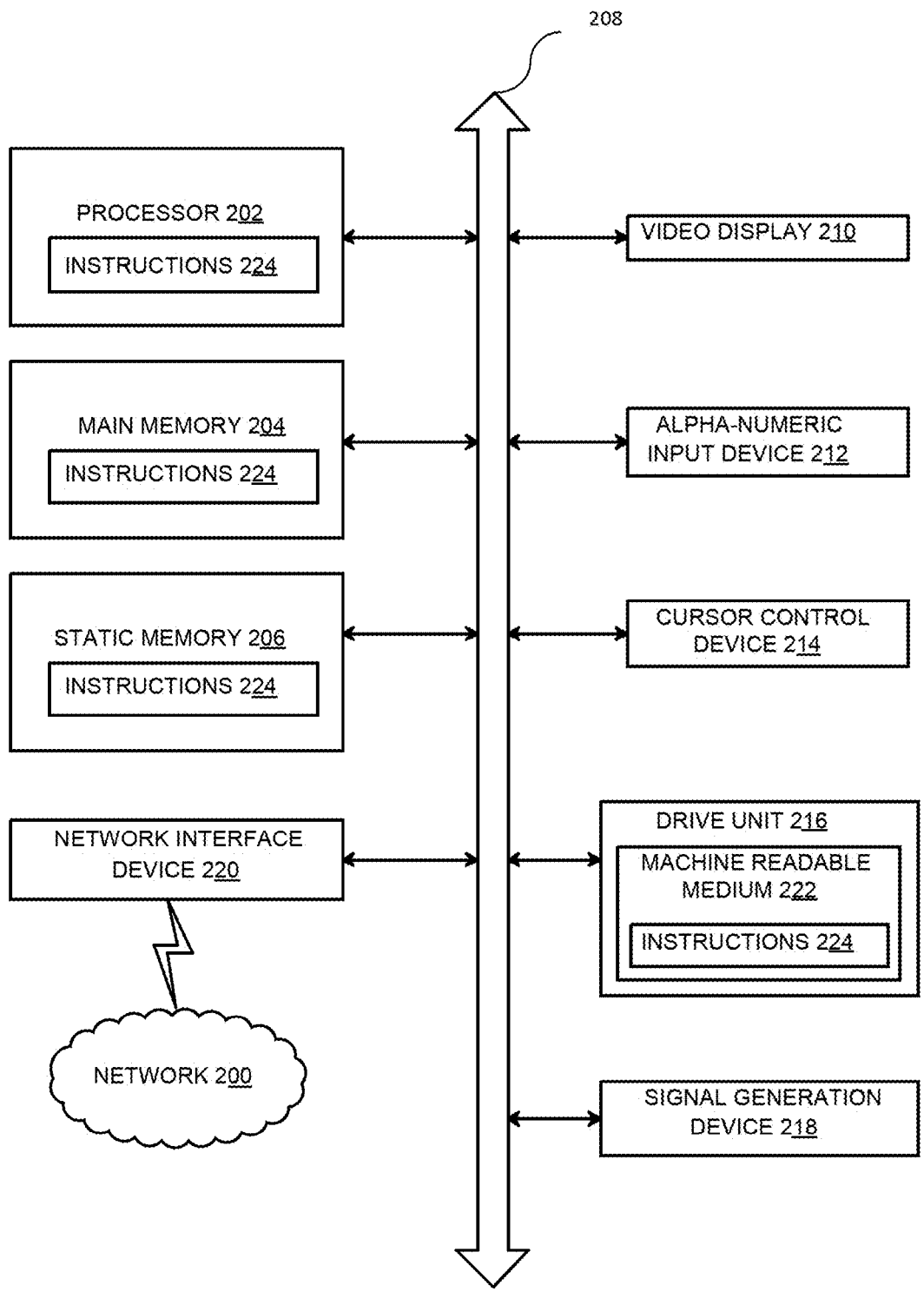
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions for causing the machine to perform any one or more of the methodologies discussed herein may be executed. In various embodiments, the machine operates as a standalone device and/or may be connected (e.g., networked) to other machines.

In a networked deployment, the machine may operate in the capacity of a server and/or a client machine in server-client network environment and/or as a peer machine in a peer-to-peer (or distributed) network environment. The machine may be a personal—computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 200 includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200. The main memory 204 and the processor 202 also constituting the machine-readable medium 222.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media and carrier wave signals.

Figure 3:
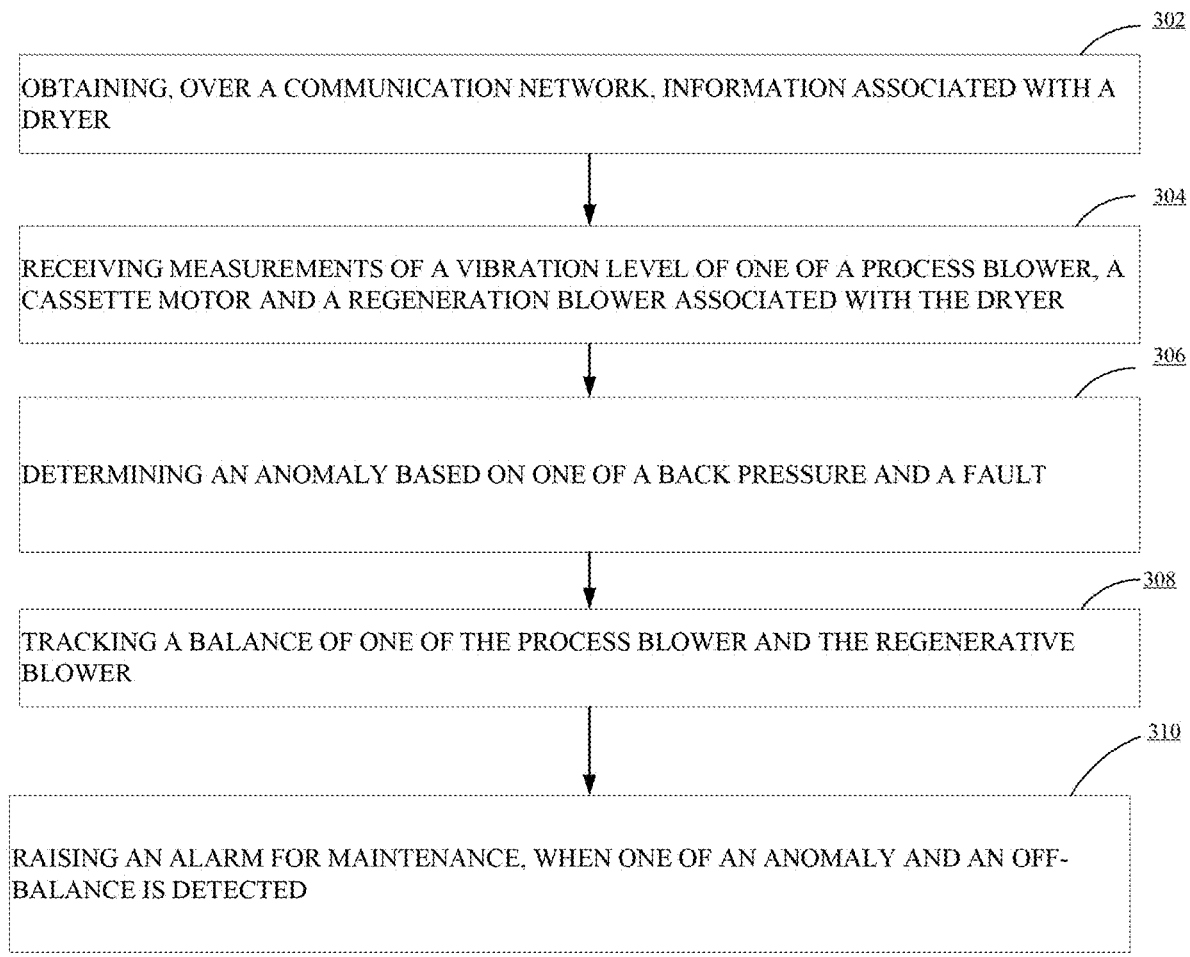
FIG. 3 is a process flow diagram detailing the operations of a method of a predictive maintenance IoT system for a dryer, according to one or more embodiments.

FIG. 3 is a process flow diagram detailing the operations of a machine learning method for predictive maintenance of a dryer. The method may include obtaining over a communication network, an information associated with the dryer 302. The information may include measurements of a current associated with one or more heaters. The heater may be associated with the dryer.

Further, the method may include receiving measurements of vibration levels of one or more of a process blower, a cassette motor and a regeneration blower associated with the dryer 304. An anomaly may be determined based on one or more of a back pressure and a fault 306. The anomaly may be determined through an IoT (Internet of Things) based method. Still further, the method may include tracking a balance of one of the process blower and the regeneration blower 308 and raising an alarm for maintenance when one of an anomaly and an off-balance is detected 310. An alarm for maintenance may be raised when an anomaly and/or off-balance is predicted by a machine learning engine associated with a machine learning algorithm.

In one or more embodiments, the method of machine learning architecture of a dryer may also include determining motor sensor data from the machine wearable sensor placed on the motor and determining blower sensor data from the machine wearable sensor placed on the blower.

In one or more embodiments, the communications network may be one of Wi-Fi, 2G, 3G, 4G, GPRS, EDGE, Bluetooth, ZigBee, Piconet of BLE, Zwave, or a combination thereof. The machine learning architecture may be associated with a machine learning algorithm.

In one or more embodiments, the motor sensor data and blower sensor data may be received over a communications network onto a mobile application associated with a mobile device.

An alarm may be raised over the communications network through one of a notification on the mobile application, short message service (SMS), email, or a combination thereof.

In an example embodiment, the Internet of Things (IoT) based system may include machine wearable sensors. Further, the IoT system may be used for overseeing process control and predictive maintenance of a machine or a network of machines. The system may include a plurality of machine-wearable sensors, each of which secured to the exterior of the machine. Each sensor may be capable of transmitting captured data wirelessly over a communications network. The system may further include a sensor network for receiving and transmitting the captured data over a communications network and a machine learning algorithm engine capable of receiving data from the sensor network. The machine learning algorithm engine may process the received data to recognize one of a pattern and a deviation to issue control commands pertaining to the machine. Lastly, the system may include one or more control modules disposed in operative communication with a control panel of the machine, the control module capable of receiving over a communications network, the control commands and executing the control commands.

In an example embodiment, a machine learning algorithm engine may raise an alarm when one of a back pressure and fault in the system is detected. Back pressure may be a pressure opposed to a desired flow of one of a liquid and a gas in a confined space. A plurality of machine wearable sensors may include a motor sensor and a blower sensor. The machine learning algorithm engine associated with the IoT based system may issue commands based on a learning outcome from the motor sensor data and the blower sensor data. The learning outcome may be dependent on recognition of one of a pattern and deviation by the machine learning algorithm engine.

In an example embodiment, a machine learning algorithm engine may include three layers. The three layers of the machine learning algorithm engine may be used for predictive and preventive maintenance of a dryer.

The machine learning algorithm engine may deploy three layers of supervised machine learning for predictive and preventive maintenance. Layer one of the supervised machine learning may receive vibration data from motor and/or blower. The vibration data may be classified into various states.

Figure 4:
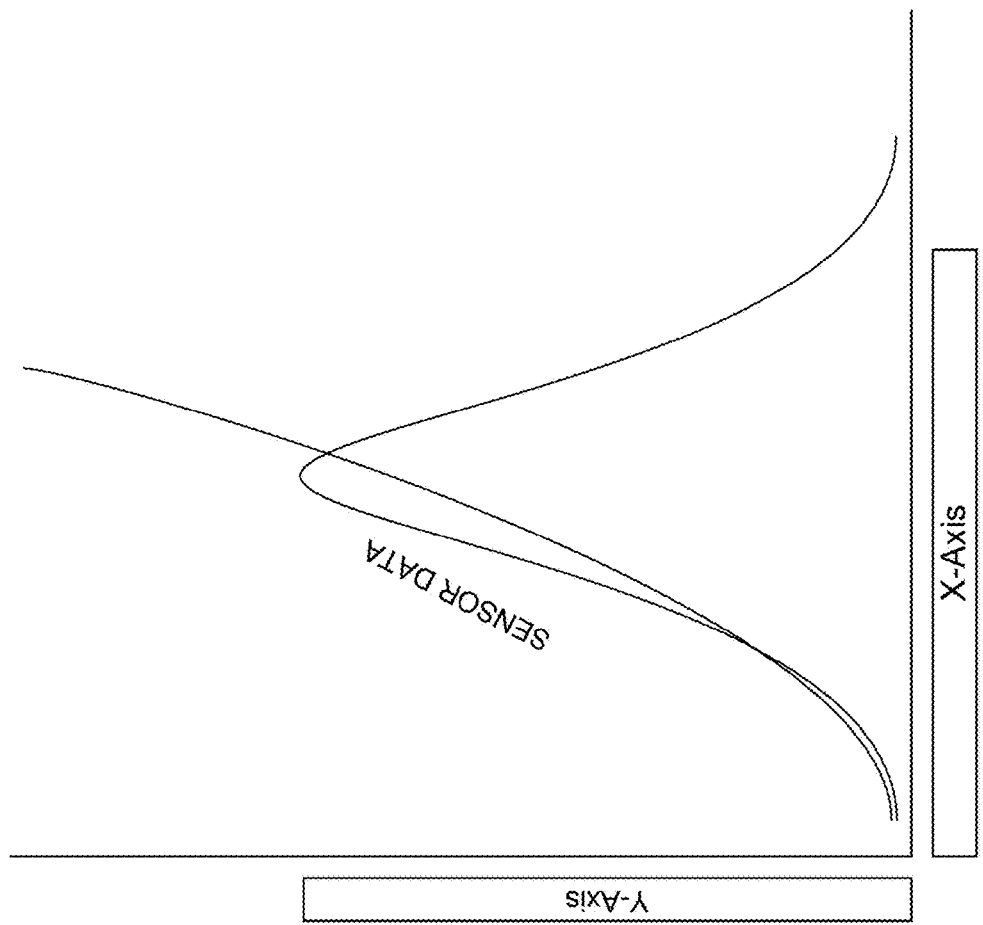
FIG. 4 shows a sensor data representation on a mobile application associated with a mobile device, according to one example embodiment.

FIG. 4 is an exemplary representation of data on a mobile application associated with the machine learning architecture, according to one or more embodiments. FIG. 4 may show a sensor data representation on a mobile application associated with a mobile device.

Dryers may run to failure very often due to abusive operation coupled with poor maintenance. Dryers may report one or more of vibration, pressure, sound, back pressure, and other detected anomalies. Data from sensors associated with the dryers may be used by a platform to check against a baseline dryer database and the platform offers early warning for dryer failure and/or real time alarm for abusive operation. Various data associated with a dryer, such as vibration may be tracked. From machine learning algorithms of data, the platform sends out early indication of faulty dryer operation.

Vibration data may help to identify faulty operation of a dryer and help to stop abusive operation.

Principal Component Analysis (PCA) is a statistical procedure that uses an orthogonal transformation to convert a set of observations of possibly correlated variables into a set of values of linearly uncorrelated variables called principal components. The number of principal components selected for further analysis may be less than and/or equal to the number of original variables. Projections may be made onto a principal component subspace for a training data. Based on the projections, classifications of hyper places may be made from the training data.

In an example embodiment, data may be collected from diverse locations such as 10,000 factory locations for 3P (prescriptive, preventative and predictive) maintenance by using a combination of Cassandra (distributed database), Storm and/or Spark real time to process the data in a real time Big Data architecture and implemented using a broker system such as Kafka for storing the alarms as buffer database and then using Storm and/or Cassandra like distributed database for an MRO (maintenance, repair and operation) system.

In one or more embodiments, a prescriptive, preventative and predictive maintenance may be a possibility for a machine. Big data methodologies may be employed to analyze data obtained from various locations through an IoT sensor network. Big data may be used to describe a massive volume of both structured and unstructured data. Large volumes of data may be difficult to process using a traditional database and traditional software techniques. Therefore, a distributed real-time computation system such as Apache Storm may be used.

In an example embodiment, a real time data processing system may be associated with distributed databases. The real time data processing system may be a big data system.

Figure 5:
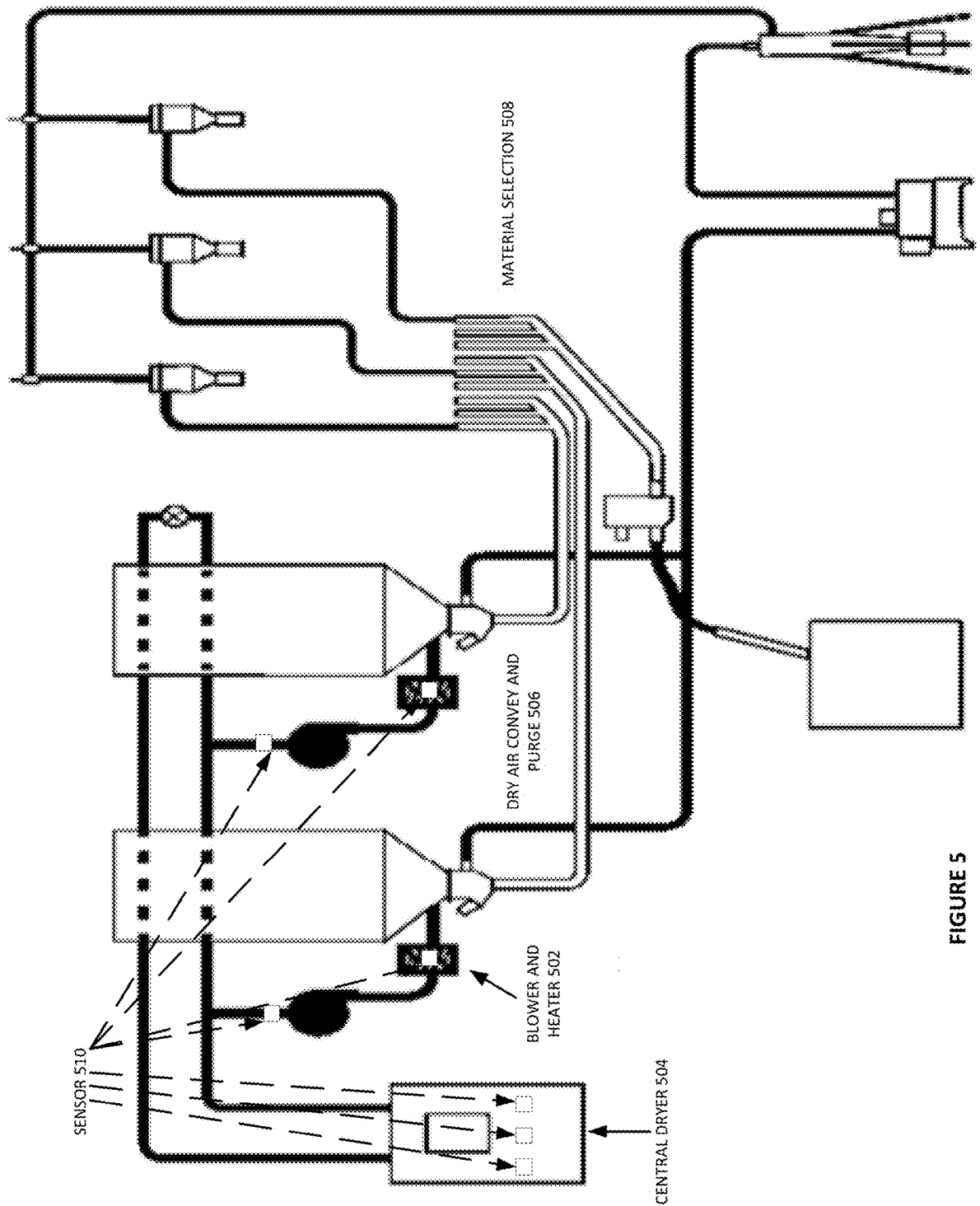
FIG. 5 is a diagrammatic representation of a central drying system, according to one embodiment.

FIG. 5 is a diagrammatic representation of a central drying system, according to one embodiment. The central drying system may include a blower and heater 502, a dry air convey and purge 506, a central dryer 504, a material selection unit 508 and a set of sensors 510. The sensors 510 may be magnetically mounted onto various locations on the central drying system.

Figure 6:
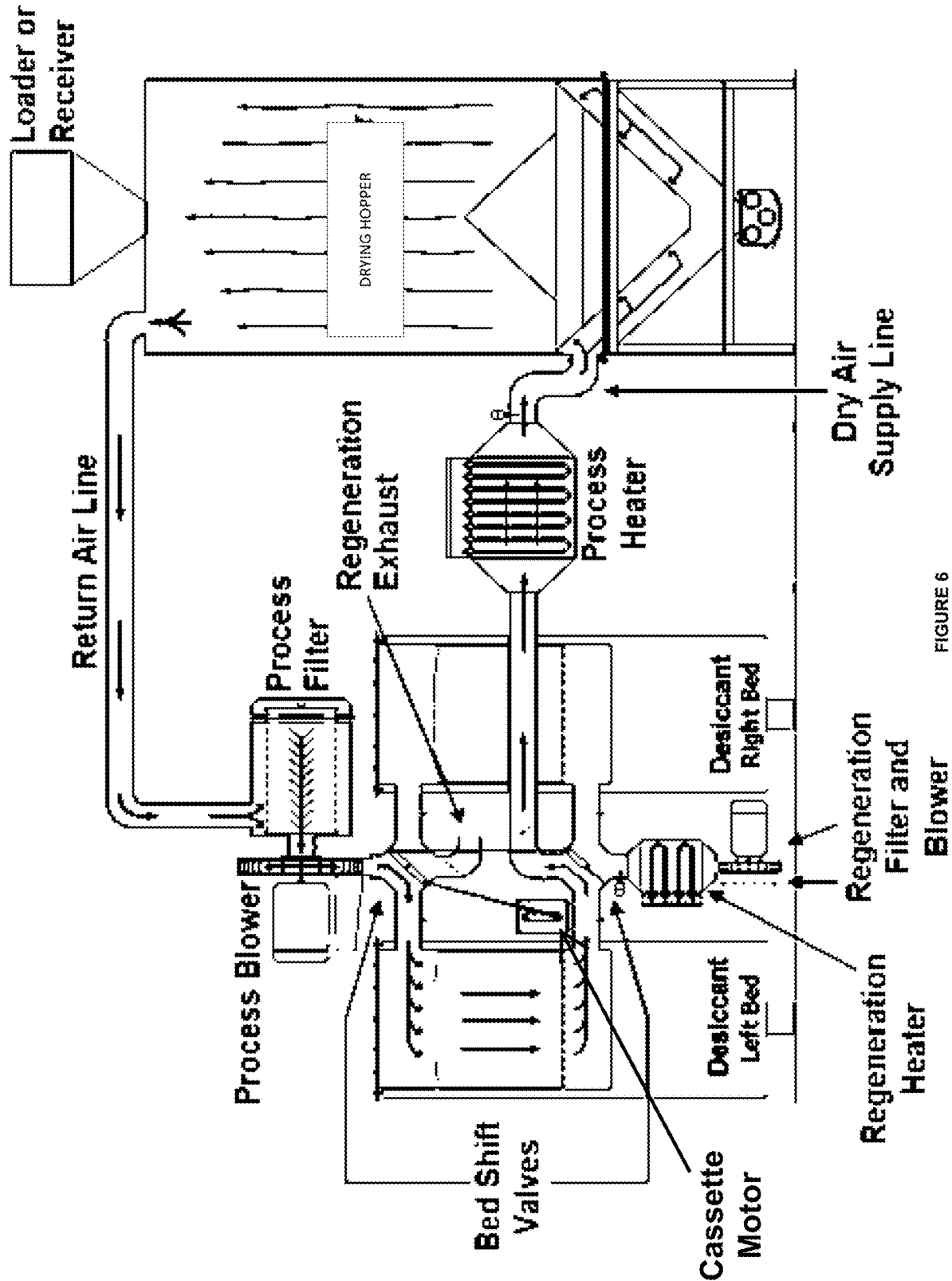
FIG. 6 is a diagrammatic representation of a dual bed drying system, according to one embodiment.

FIG. 6 is a diagrammatic representation of a dual bed drying system, according to one embodiment.

Figure 7:
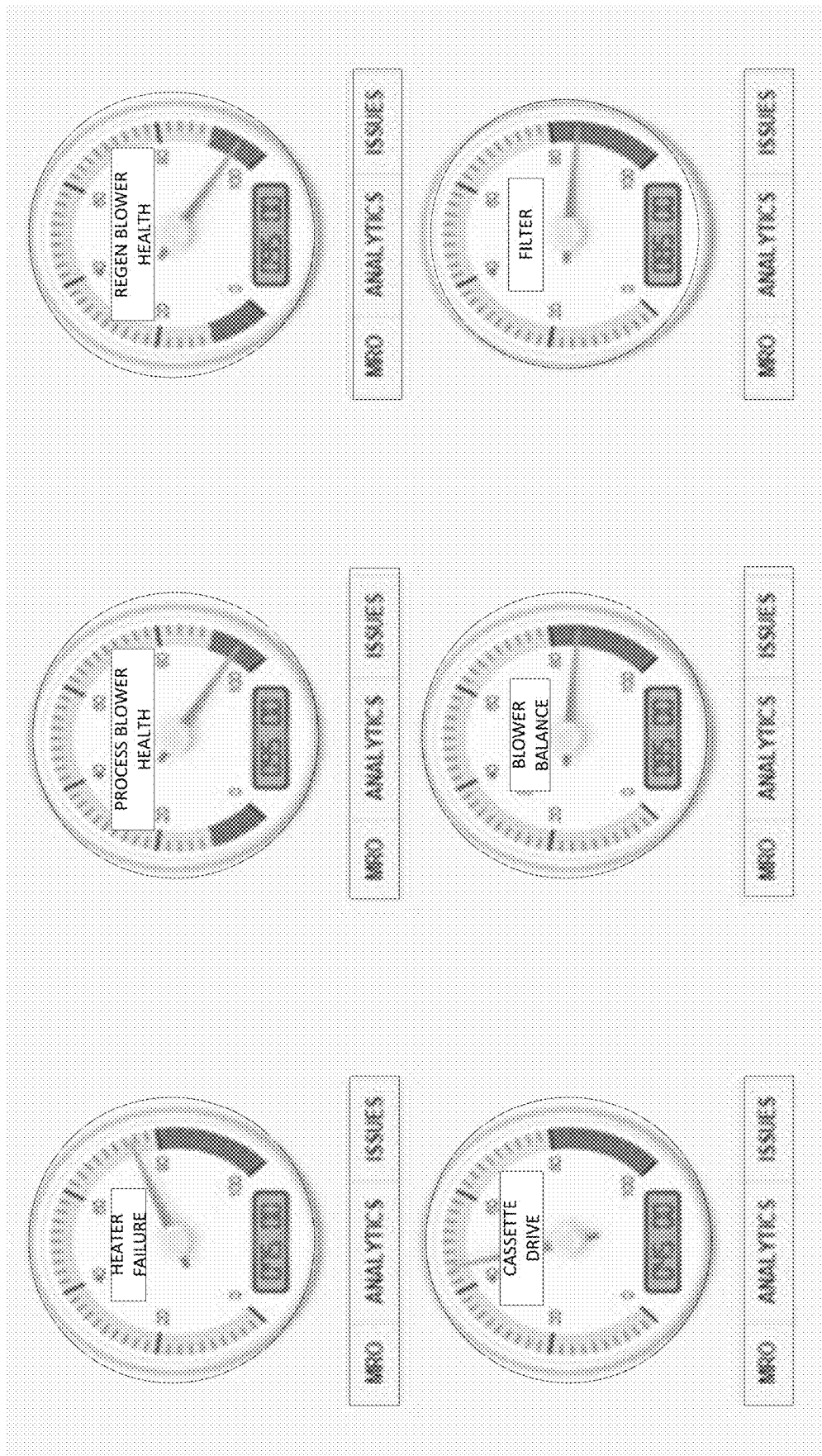
FIG. 7 is a diagrammatic representation of a predictive maintenance dashboard showing a gauge, according to one embodiment.

FIG. 7 is a diagrammatic representation of a predictive maintenance dashboard showing a gauge, according to one embodiment. A gauge mechanism on a user interface may have various advantages including communication of a system status with personnel not trained to read system readings.

Figure 8:
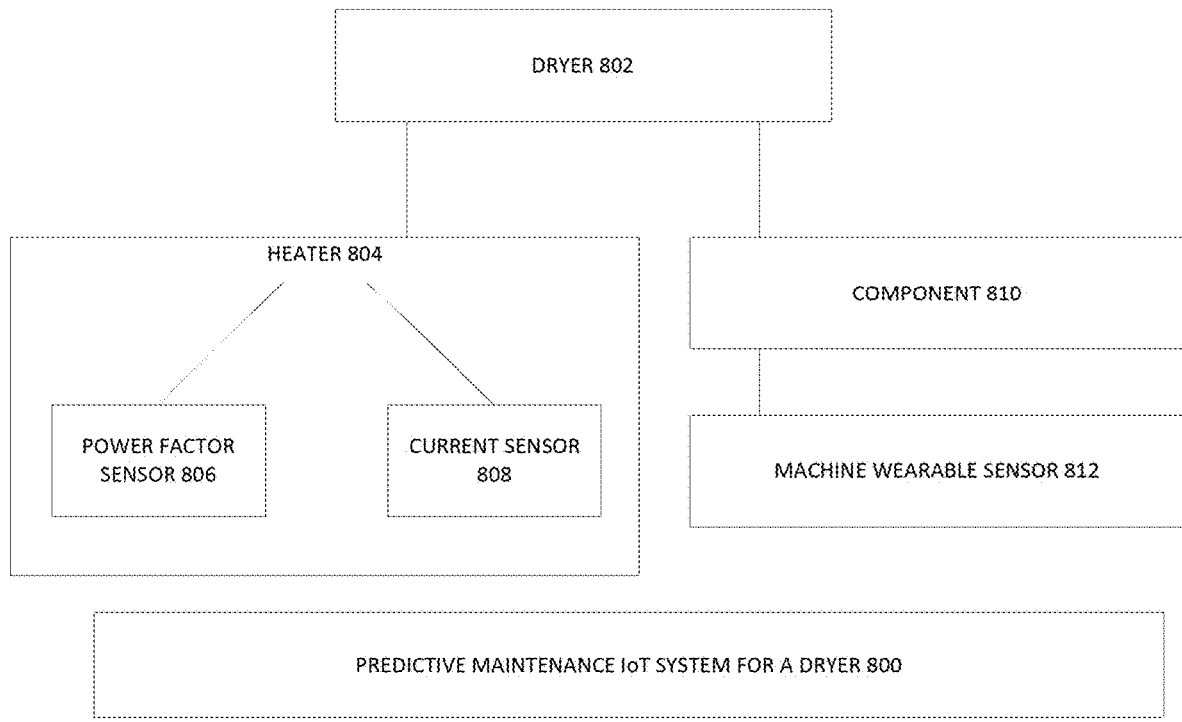
FIG. 8 is a diagrammatic representation of a predictive maintenance IoT system for a dryer, according to one embodiment.

FIG. 8 is a diagrammatic representation of a predictive maintenance IoT system for a dryer 800 according to one embodiment. In one or more embodiments, a sensor associated with a heater 804 may be a power factor 806 and/or a current sensor 808. The heater 804 may be coupled to a dryer 802. The machine wearable sensor may be attached through a Three (3) phase and/or Two (2) phase line associated with the heater 804. Further, the dryer 802 may include a component 810 associated with a machine wearable sensor 812.

Figure 9:
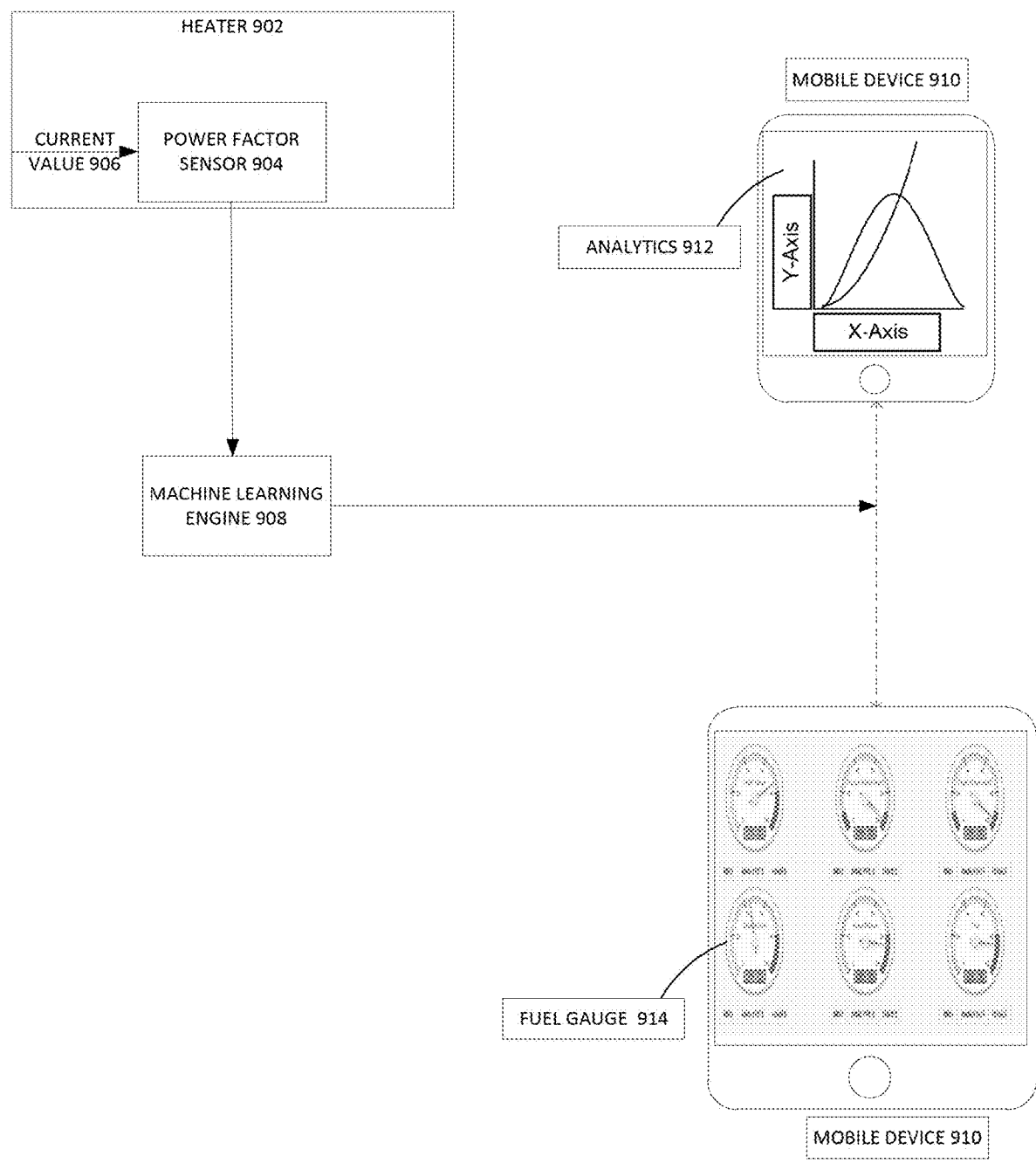
FIG. 9 is a diagrammatic representation of a heater sub-system, according to one embodiment.

FIG. 9 is a diagrammatic representation of a heater sub-system, according to one embodiment. A heater 902 may be associated with a power factor sensor 904 for taking a current value 906. The current value 906 may be analyzed through a machine learning engine 908. A result of the machine learning engine's analysis may be displayed through a mobile application associated with a mobile device 910. The mobile device may display over the mobile device's 910 user interface an analytics 912 result such as a graph and/or show a predictive maintenance fuel gauge 914.

Figure 10:
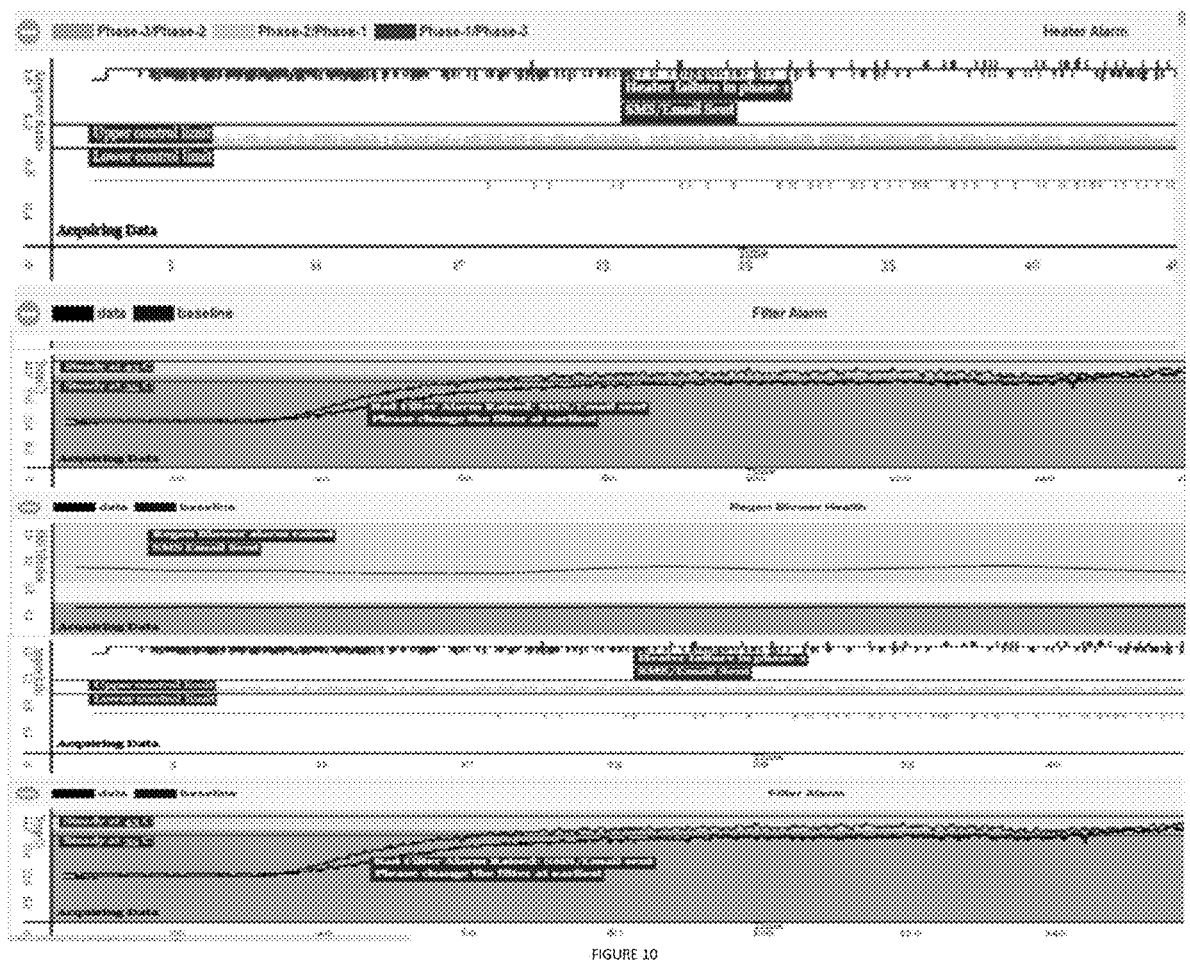
FIG. 10 is a snapshot of an analytics dashboard detailing, according to one embodiment.

FIG. 10, is a snapshot of an analytics dashboard detailing, according to one embodiment. The analytics dashboard may include graphs and other forms of representation of data. A pictorial representation of data (such as a graph) has the advantage of being easily understood by untrained maintenance personnel.

In one or more embodiments, a processor may be configured to execute instructions stored on a non-transitory computer readable storage medium. The instructions when executed by the processor may cause the processor to receive a sensor data over a communication network. The sensor data may be one or more of a vibration and a current measurement. The processor may be caused to determine a failure data associated with the at least one heater and determine an anomaly based on one or more of a back pressure and a fault. The failure data may indicate a time of heater failure through a calculation based on a reading of current at a machine wearable sensor associated with the one or more heaters. Further, the instructions when executed by the processor may cause the processor to track a balance of one or more of the process blower and the regeneration blower and raise an alarm for maintenance, when one or more of an anomaly and an off-balance is detected. The anomaly and the off-balance may be one of detected in real-time and predicted for a future time. The prediction may be based on a machine learning algorithm.

In an example embodiment, a drying process with a check on health may be available by tracking temperature and flow data at inlet, outlet and on site glass of a drying hopper. A recorded database may be created for normal and/or baseline operation with a clean filter. By comparing with the baseline operation, a mobile application may indicate degradation of filters and drying process. The mobile application may also offer recommended operation for optimal temperature to save energy. In addition, mobile application may also be a platform for dryer maintenance.

In one or more embodiments, a machine learning architecture may be associated with a machine learning algorithm where normal states of the dryers with operational may be learned with a baseline reading and anomalous readings. The baseline reading and the anomalous readings may be used as a training database for the machine learning algorithm.

In one or more embodiments, data from multiple dryers associated with machine wearable sensors may be acquired. One of a mobile, a web and a desktop application may act as a mobile middleware to scale the machine learning architecture to a single data collection unit. The single data collection unit may be one of a mobile device and a wireless device.

In one or more embodiments, a predictive and preventive maintenance system for a dryer may include one or more machine wearable sensors associated with the dryer, a machine learning module associated with a database and a communications network. A changing condition of dryer may be tracked through the tracking module over the communications network. The tracking module may receive information of a back pressure and anomaly from one or more machine wearable sensors. The machine learning module associated with the tracking module may identify a pattern from the received information. The machine learning module may raise an alarm based on an analysis of the pattern.

In one or more embodiments, a machine learning method for predictive maintenance of a dryer includes various steps. Information associated with the dryer may be obtained over a communication network. The information may comprise measurements of a current associated with one or more heaters of a heater bank. The heater bank may be associated with the dryer.

A failure data associated with the one or more heaters may be determined. The failure data may indicate one of a poorly functioning and a failed heater. The failure data may be determined through a comparison of ratio of three phase currents with a healthy heater calculation using one of a split-core transformer type based on a reading of current at a machine wearable current sensor and a Hall Effect based current sensor associated with the one or more heaters. Measurements of a vibration level of one or more of a heater, a process blower, a cassette motor and a regeneration blower associated with the dryer may be received. An anomaly may be determined based on characteristic of vibration and/or magnetic field (such as root mean square value, Skewness and Kurtosis).

Further, the anomaly may be determined through an IoT based method. The vibration and/or magnetic field of one of the process blower and the regeneration blower may be tracked and an alarm for maintenance may be raised when one of an anomaly or any other abnormality and misalignment is one of a detected in a real-time and predicted for a future time. The prediction may be based on a machine learning algorithm and/or a look up table that stores the database for healthy heaters, blowers and cassettes.

Machine learning architecture may be associated with the machine learning algorithm where normal states of the dryer may be learned with a baseline reading and anomalous readings from the back pressure and the misalignment of the blowers.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware and software (e.g., embodied in a machine readable medium). For example, the various electrical structure and methods may be embodied using transistors, logic gates and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices) and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above. The computer program may, for example, be implemented in an operating system, be an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. Moreover, the scope of this patent application is not intended to be limited to the particular implementations of apparatus and methods described in the specification, nor to any methods that may be described or inferentially understood by those skilled in the art to be present as described in this specification.

As one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention."

We claim the following:

1. A method for drying granular resin material prior to molding or extrusion of the material to fabricate plastic articles, comprising:
   (a) providing into a drying hopper granular resin material to be dried;
   (b) furnishing drying air heated by a process heater and advanced by a process blower to the drying hopper at the drying air inlet via a dry air supply line;
   (c) furnishing a plurality of IoT machine wearable sensors connected to the apparatus for sensing physical parameters comprising blower oil temperature, drying heater inlet air temperature, drying heater outlet air temperature, resin temperature at discharge from the drying hopper, resin moisture level at discharge from the drying hopper; vibrational level of the process blower, air flow rate through a filter, desiccant moisture level in respective regeneration beds, and process heater current;
   (d) drawing moist drying air from the drying hopper;
   (e) filtering the moist drying air;
   (f) directing the filtered moist drying air alternatingly through one of a pair of rechargeable desiccant beds;
   (g) heating the air with an electrical heater after passage through the desiccant beds for recycle delivery to the drying hopper as the drying air;
   (h) providing an IoT communications network connected to the Internet and receiving the sensed parameter data thereover;
   (i) providing an IoT data collection unit connected to the communications network via the Internet and receiving data indicative of the sensed parameters thereover;
   (j) providing a computer including a processor and a database, connected to the Internet and receiving data thereover from the collection unit, the computer having software, including a machine learning engine, therewithin for:
      (i) creating a dryer performance model by processing previously collected data representative of dryer performance within design specifications;
      (ii) receiving data via the Internet from the collection unit;
      (iii) comparing that data to the dryer performance model;
      (iv) comparing temperature of resin discharged from the drying hopper to a design specification temperature;
      (v) determining an anomaly in the operation of the dryer based on comparing the data to the dryer performance model; and
      (v) raising an alarm for maintenance when the anomaly is at least one of a detected in a real-time and predicted for a future time, wherein the prediction is based on a machine-learning algorithm.

* * * * *